United States Patent [19]

Leuschner et al.

[11] 4,262,585

[45] Apr. 21, 1981

[54] ELECTRIC COFFEE MAKER

[75] Inventors: Udo Leuschner, Traunwalchen; Alfons Zinsberger, Traunreut, both of Fed. Rep. of Germany

[73] Assignee: Bosch Siemens Hausgerate GmbH, Stuttgart, Fed. Rep. of Germany

[21] Appl. No.: 20,095

[22] Filed: Mar. 13, 1979

[30] Foreign Application Priority Data

Mar. 16, 1978 [DE] Fed. Rep. of Germany ....... 2811497

[51] Int. Cl.³ .............................................. A47J 31/00
[52] U.S. Cl. ......................................... 99/280; 99/306
[58] Field of Search .................................. 99/280–285, 99/179, 288, 295, 306, 307; 219/432, 433, 448, 492, 493; 126/344, 350 R

[56] References Cited

U.S. PATENT DOCUMENTS

| | | | |
|---|---|---|---|
| 3,530,276 | 9/1970 | Wells | 219/334 |
| 3,858,569 | 1/1975 | Berger | 126/344 |
| 3,987,717 | 10/1976 | Bergmann et al. | 99/280 |

FOREIGN PATENT DOCUMENTS 2620213 11/1977 Fed. Rep. of Germany ............. 99/280
2641312  7/1978 Fed. Rep. of Germany ............. 99/280

Primary Examiner—Leonard D. Christian
Attorney, Agent, or Firm—Herbert L. Lerner

[57] ABSTRACT

Electric coffee maker in which the water is transported from a fresh-water tank through a cold water line to a water heater, and from there through a hot-water line to a coffee filter. The coffee maker has incorporated a valve and a timer, called a time delay valve, which in conjunction with the heater and cold water line holds back or delays the full transport of water from the fresh-water tank and permits no flow of water or only a minimal amount of it to be transported for an initial period of time. This permits liquid ducts and receptacles downstream from the water heater to be preheated and thus smaller amounts of really hot coffee can be taken from coffee makers which are designed for larger quantities of coffee.

13 Claims, 6 Drawing Figures

ELECTRIC COFFEE MAKER

BACKGROUND OF THE INVENTION

1. Field of the Invention

This invention relates to an electric coffee maker, in which the water is transported from a fresh-water tank via a cold water line to a water heater comprising a heating element and from there, through a hot-water line, to a coffee filter.

2. Prior Art

In known coffee makers of this type, the hot-water line and the coffee filter as well as the coffee pot disposed underneath the filter are still cold at the start of the brewing process and must first be warmed up, in the process of which they remove part of the heat from the transported hot water. In the customary household coffee makers, cold water stands furthermore in the standpipe up to the level of the water surface in the fresh-water tank when the brewing process starts. In that case, the standpipe is part of the hot-water line and therefore, cold water is downstream from the water heater and is pushed out of the hot-water line into the filter at the start of the brewing process and then flows into the coffee pot. For these reasons, it is impossible to take a small amount of coffee such as one or two cups from the coffee maker really hot immediately after the end of the brewing, which is true especially for coffee makers which are designed for a larger maximum volume of coffee. The prepared coffee must therefore still be heated up subsequent to the brewing process by the hot plate.

FIELD OF THE INVENTION

It is an object of the invention to provide an electric coffee maker of the class mentioned with a preheater for the liquid ducts and liquid receptacles located downstream from the water heater, so that smaller amounts of really hot coffee can also be taken from coffee makers which are designed for larger quantities of coffee.

With the foregoing and other objects in view, there is provided in accordance with the invention, an electric coffee maker, having a fresh-water tank from which water is transported through a cold-water line, to a water heater, and from there through a hot water line, to a coffee filter, including a heating device acting on the hot water line, means to activate the heating device, and time delay means disposed in the cold water line which sets full water transport into operation with a time delay after the heating device acting on the hot-water line has been activated.

Other features which are considered as characteristic for the invention are set forth in the appended claims.

Although the invention is illustrated and described herein as embodied in an electric coffee maker, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawing, in which.

DETAILED DESCRIPTION OF THE INVENTION

Figure 1:
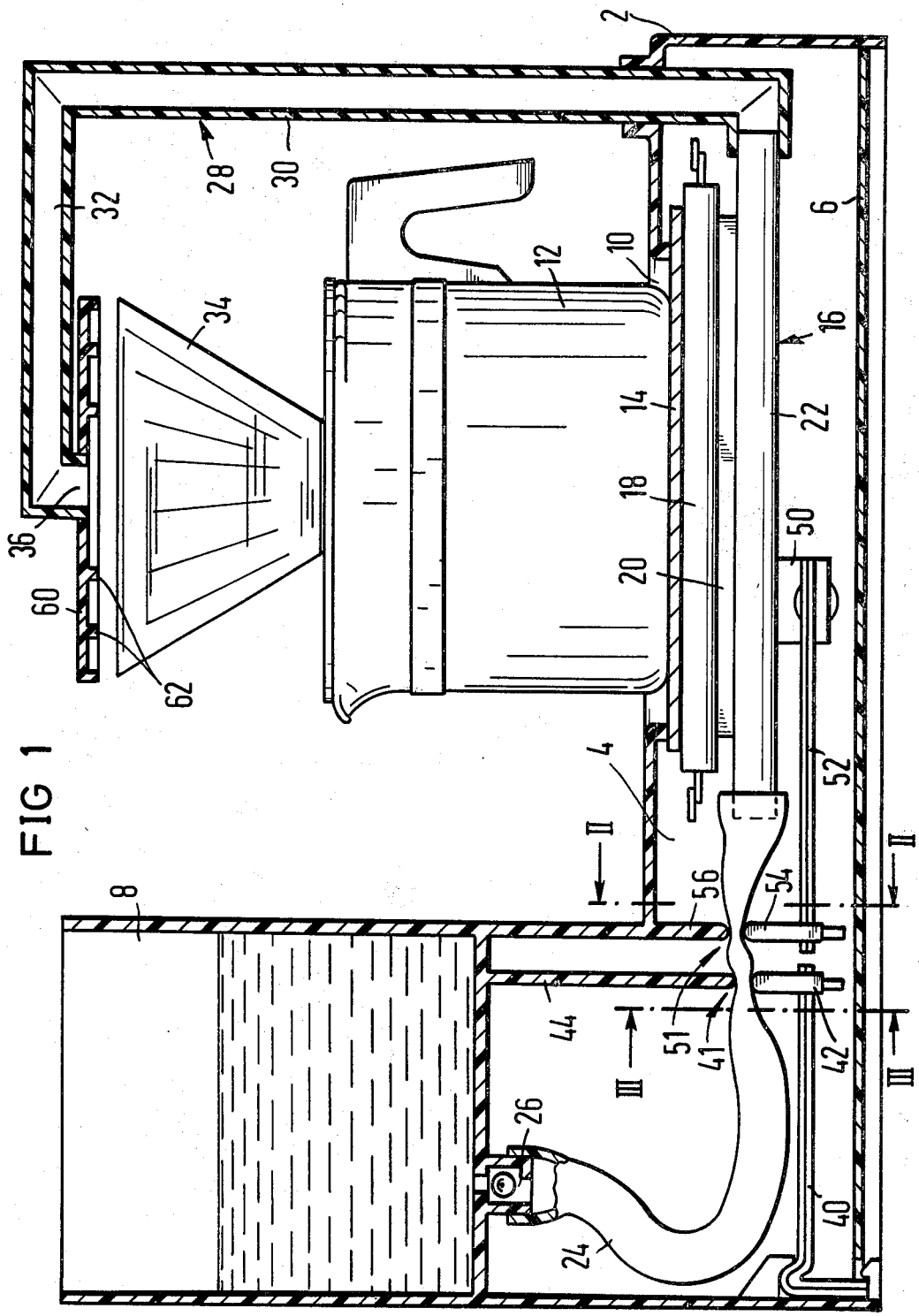
FIG. 1 shows a first embodiment of a coffee maker according to the invention, partially cut open along a vertical plane.

According to the invention, there is provided a preheating device and a timing device which sets the full transport of water in operation with a time delay. The preheating device can be realized in different ways as will be shown in detail. During this time delay, no water or only a minimal amount of water must be transported. Advantageously, the timing device initiates the full water transport with a certain time delay after the preheater is switched on. The combination of a valve and a timer can also be called a time delay valve.

In coffee makers with a keep-hot heater under the hot plate for the coffee pot and a separate water heater, the keep-hot heater can serve as the preheater for at least part of the hot-water ducts and the timer for starting the water transport can switch on the water heater. It is assumed that the keep-hot heater and part of the hot-water ducts such as the standpipe are arranged together in the cavity of the housing and the coffee pot with the air therein is heated up by the hot plate and air escaping therefrom also warms up the filter. However, the water heater can also serve as the preheater; then, the timer for starting the full water transport actuates a valve device arranged in the cold-water line in the opening direction. This procedure has the advantage that the water flows into the hot water heater and evaporates there more or less completely, and the steam ejected through the hot-water line rapidly heats up the hot-water line and also the filter. It is particularly advantageous if the valve device comprises a throttle valve with a minimum passage opening, which throttle valve can be opened full for starting the full water transport. This throttle valve has the advantage that it feeds to the water heater, possibly over an extended period of time, so small an amount of water that it is always evaporated. The minimum opening of the throttle valve can be designed so that in relation to the heater power of the water heater, the steam also takes along, i.e., entrains unevaporated water droplets. The steam and possibly taken-along or entrained water droplets moisten the coffee grounds and break up the latter before the normal brewing process begins. The timing device can now be set so that the coffee grounds are broken up optimally and, in particular, can swell up sufficiently. These advantages are so important that separate protection is claimed for the arrangement of a time delay valve in the cold-water line, i.e., the combination of a valve device and a timer controlling the latter.

The valve device an also comprise a shut-off valve. If the latter is used alone, only a short steam pulse is sent through the hot-water line before the normal brewing process beings. If the shut-off valve is arranged in series with the throttle valve which has a minimum passage opening, the advantage is obtained that switching-on of the coffee maker, which in general means switching on the transporting water heater, need not be switched on immediately after the fresh water is filled into the fresh-water tank. The fresh water can be filled in hours before and the appliance can be started via an alarm clock which is set, for instance, to the morning wake-up hours, without the water heater being filled full of water. However, if may also be useful to let the water heater and possibly also the standpipe run full completely or partially with the throttle valve closed down to its minimum opening and then to switch on the water heater, so that the water that has run in is pushed into the filter, wetting the coffee grounds. Since the fresh water is initially fed into the water heater only, the cold water line is throttled. Only steam is subsequently generated, which, as described before, serves for heating up the hot-water passages and further moistens the coffee grounds. As long as the water supply is throttled, the coffee grounds have time to swell. The timer then opens the throttling valve to full unthrottled passage with a time delay, whereupon the normal hot water transport into the filter with the broken-up coffee grounds sets in.

The timing device therefore opens, advantageously, the throttling valve to full passage with a time delay after the shut-off valve is opened. In addition, the timing device of the shut-off valve can open with a time delay after the water heater is switched on so that, as already discussed, the steam generation begins immediately with the throttled water supply to the water heater. Alternatively, however, the sequence can also be reversed and the timing device can switch on the water heater with a time delay after the shut-off valve is opened, in order to make the water advance to break up the coffee grounds with a subsequent steam phase for heating up.

Figure 4:
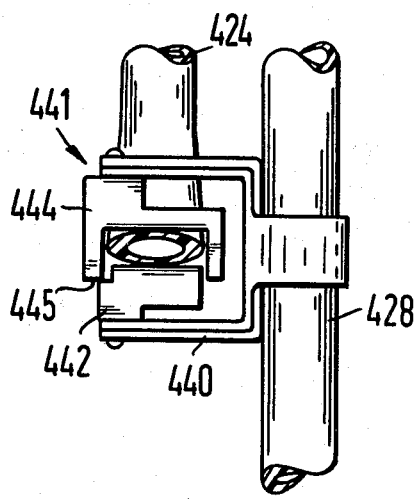
FIG. 4 shows a modified embodiment of a throttling valve, in a side view and partially in cross section.

According to one advantageous embodiment, a temperature control device with at least one temperature sensor, preferably of bimetal, serves as the timing device. The time delay is achieved by the fact that heating up the surroundings of the temperature sensor or the temperature sensor itself takes time. Such a timing device is inexpensive to manufacture and provides considerable positioning forces. The temperature sensor is advantageously arranged in a housing cavity which contains the water heater. A temperature sensor which operates the shut-off valve and heats up fast and therefore opens the shut-off valve fast, can be arranged at the water heater. According to one practical embodiment, the throttling valve is controlled by a temperature sensor disposed at the hot-water line. This can be arranged easily particularly if the hot-water line is conducted as a standpipe through the column containing the fresh-water tank of the coffee maker and, in its lower part, is thus immediately adjacent to the cold-water line (FIG. 4).

According to a particularly simple embodiment, which can be produced at low cost, a throttling valve which responds to the temperature of the fresh water and can be opened for full passage, is arranged in the cold-water line. Such a valve can also prevent the unnecessary excessive evaporation which occurs if the coffee maker is used again when the water heater is still hot, since it closes if the cold-water line runs dry and only admits a throttled inflow of fresh water. This closing is aided by the heat in the cavity of the housing if the coffee maker is still warm.

The invention will be explained in greater detail in the following by way of embodiment examples with the aid of the schematic drawings.

Figure 2:
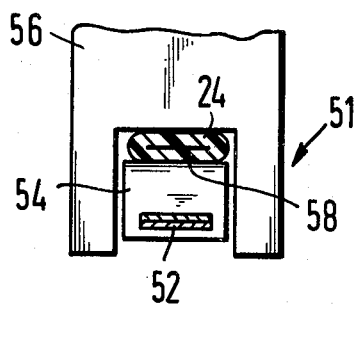
FIG. 2 shows in more detail a section of a shut-off valve, taken substantially along the line II—II in FIG. 1.
Figure 3:
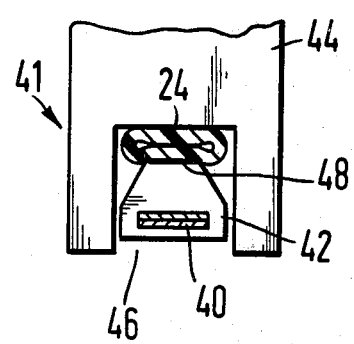
FIG. 3 shows in more detail a section of a throttling valve, taken substantially along the line III—III in FIG. 1.

The electric coffee maker shown in FIGS. 1 to 3 comprises a fresh-water tank 8 on a housing base 2. The housing cavity 4 in the housing base 2 is closed off by a hot plate 14, on which the coffee pot 12 can be deposited. In the bottom side of the hot plate 14 is a water heater in the form of a flow-through (continuous-flow) heater 16. The continuous-flow heater 16 has a tubular heating element 18 which rests against the hot plate 14 and is connected via a rib 20 to a water tube 22 underneath in a heat-conducting manner. The water tube 22 is connected on the one side to the fresh-water tank 8 via a cold-water hose 24 and a check valve 26. A hot-water line is connected to the other end of water tube 22, and consists of a standpipe 30 and an overflow tube 32 and ends above a coffee filter 34 placed on the coffee pot 12, with a run-out or discharge opening 36 which points down.

At the side wall of the housing base 2, a bimetal arm 40 is snapped in, which is otherwise freely cantilevered and carries in the vicinity of its end a squeezing head 42. Squeezing head 42 together with an abutment 44 protruding in the housing cavity 4 from the bottom of the fresh-water tank 8 downward can squeeze the cold-water hose 24, as can be seen in particular, from FIG. 3. The abutment 44 has in its lower end section a rectangular edge cutout 46, against the upper edge of which the cold-water line 24 rests and in the lower region of which the squeezing head 42 is guided. The upper edge 48 of the squeezing head 42 cooperating with the flexible tube 24 has a width smaller than the squeezed-together tube, so that the tube in the fully squeezed-together condition has in its outer zoned, passage openings which are not squeezed together. The flexible cold-water tube 24 together with the squeezing head 42 and the abutment 44 forms a throttling valve 41 with an always open minimum flow cross section. The bimetal arm 40 together with the tubular heater element 18 of the continuous-flow heater 16, which heats the housing cavity 4, forms a timing device.

In addition, a shut-off valve 51 is provided in series with the throttling valve 41. The hot plate 14 has an edge tab 50 which is angled off downward and at its lower end horizontally, is fastened in a highly heat-conducting manner a second bimetal strip 52 carrying a squeezing head 54 at its free end. The squeezing head 54 cooperates with an abutment 56 which protrudes downward from the upper side of the housing base 2. The lower end section of abutment 5 is shaped in the same manner as the lower end section of the abutment 44. The squeezing head 54 has a substantially straight upper edge 58 which cooperates with the flexible tube and the width of which corresponds at least to the width of the cold-water hose 24 in the squeezed-together condition, so that it can squeeze the tube 24 completely shut.

The operation of this coffee maker according to FIGS. 1 to 3 is as follows: First, an amount of fresh water corresponding to the desired amount of coffee is filled into the fresh-water tank 8, and then an on-and-off switch, not shown, is switched on and closes the heater circuit, in which the tubular heater element 18 is arranged. Thereby, the continuous-flow heater 16 heats up and heats, in addition to the hot plate 14 and the coffee pot 12 and the filter above it standing thereon, also the bimetal arm 52 of the shut-off valve 51 via the edge tab 50 of the hot plate 14. The squeezing head 54 is thereby moved downward and then remains in its lower position during the entire operation of the coffee maker, the shut-off valve 51 being opened thereby. The fresh water can now trickle, with a time delay after the tubular heater element is switched on, from the fresh-water tank 8 through the cold-water line 24 and the still closed throttling valve 41 into the water pipe 22 of the hot continuous-flow heater 16, where it evaporates immediately. The steam escapes through the hot-water line 28 and is blown from the downward-pointing opening 36 downward into the coffee filter. Due to the initially still cold hot-water line 28, part of the steam is condensed and the taken-along water droplets which may in part also come from the continuous-flow heater if the throttling point has the proper size, drop into the coffee filter and wet the coffee grounds. However, the steam is condensed also in the coffee filter. Incidentally, there is fastened above the coffee filter, at the overflow tube 32 of the hot-water line, a filter cover 60 with ring ribs which protrude downwards from its underside and from which condensed water drips into the coffee grounds. A certain time after the shut-off valve has opened, the housing cavity 4 in the base housing 2 has heated up so far that the bimetal arm 40 with the squeezing head 42 of the throttling valve 41 bends downward and opens the throttling valve for full passage, whereby now the normal uninterrupted water transport is started. Instead of the bimetal arm 40, a bimetal snap-action element can be provided in order to avoid transport difficulties if the throttling valve is not yet fully open.

FIG. 4 shows a modified embodiment of a throttling valve 441, which has a U-shaped bimetal fork 440 clamped to the hot-water line 428. At the free ends of the fork 440, squeezing heads 442 and 444 facing each other are arranged which accommodate the cold-water line 424 between them. In this case, a minimum opening of the throttling valve is ensured by a stop 445 between the squeezing heads.

This procedure has the advantage that the cold-water supply to the continuous-flow heater depends on the actual heating-up of the hot-water line.

Figure 5:
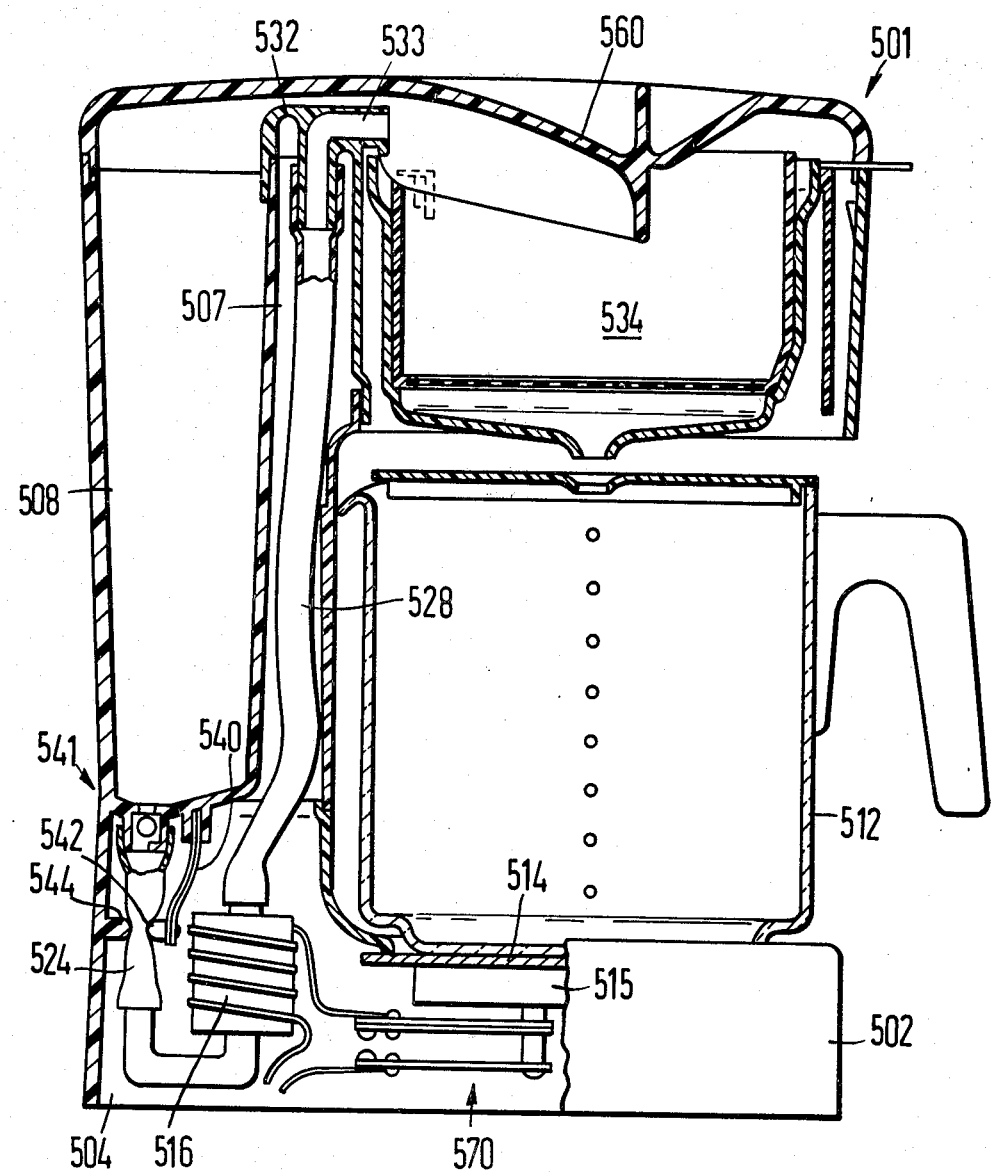
FIG. 5 is a side view, partially in cross section, of a modified embodiment of a coffee maker according to the invention.

The modified coffee maker 501 shown in FIG. 5 has a housing base 502 with a housing cavity 504 as well as with a fresh-water tank 508, where along the latter, a duct 507, connected to the housing cavity 504, for the hot-water line 528 leads upward. An overflow piece 532 terminating the duct 507 at the top, ends in a horizontal ejection canal 533 and the emitted liquid and the steam, respectively, are deflected downward into the filter 534. A coffee pot 512 stands on a hot plate 514, under which a separate heating element 515 for the holding heater is arranged. The fresh water flows from the fresh-water tank 508 through a cold-water line 524 to a vertical continuous-flow heater 516 which has a heater wire wound on its outside and is independent of the holding heater 515 and from there, through the hot-water line 528, upwards to the coffee filter 534. At the bottom of the fresh-water tank is fastened, protruding downward, a bimetal arm 540 which pushes, with a squeezing head 542 fastened to its free end, the cold-water hose 524 against an abutment 544 formed at the side wall of the housing base 502 and, together with the last-mentioned parts, forms a throttling valve 541.

Adjacent to the warm-holding heater 515, a temperature-sensitive relay 570 is arranged which closes contacts when warmed up, via which the current flows to the continuous-flow heater 516.

The operation of this coffee maker according to FIG. 5 is as follows: If the electric coffee maker is switched on, the keep-hot heater 515 is switched on immediately and heats up the housing cavity 504 with the duct 507 connected thereto for the hot-water line 528. The hot-water line is therefore heated from the outside by hot air. Also fresh water which trickles during this time into the continuous-flow heater 516 through the throttling valve 541 and possibly also into the hot-water line 528, is slightly preheated. At the same time, the relay 570 is also heated up and closes with time delay the heating circuit for the continuous-flow heater 516. As soon as the continuous-flow heater 516 is heated, it evaporates the water therein and transports steam or a steam-water mixture via the hot-water line 528 into the coffee filter 534 filled with coffee grounds, where the coffee grounds are wetted and begin to swell. Since the fresh-water supply is still throttled by the throttling valve 541, steam is continued to be generated for some time until the bimetal arm 540, which is heated mainly by the continuous-flow heater, fully releases the hose, which starts the normal water transport.

While heating the line with steam is very effective and fast, the coffee maker according to FIG. 5, even if the throttling valve 541 is omitted, has a preheating provision for the hot-water line by the heating of the air in the housing cavity 504 and the connected duct 507 by means of the keep-hot heater 515, which in addition heats the coffee pot 512, the air therein and, through escaping air, the coffee filter 534 from the outside.

Figure 6:
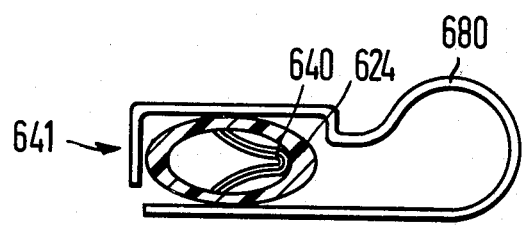
FIG. 6 is a cross section through the fresh-water line in connection with a further, modified valve device.

In FIG. 6, a further embodiment is shown for time control of a throttling valve 641 in the cold-water line. The cold-water line 624 is embraced on two sides by a spring clip 680 compressing it. At the point of the spring clip 680, a two-legged bimetal clamp 640 is inserted into the line 624. At the ambient temperature, bimetal clamp 640 consists of two adjacent legs which are bent apart upon contact with cold water as seen as they have assumed the temperature of the latter, and thereby releases a sufficient passage cross section for an unimpeded flow to the continuous-flow heater. While this particularly simple embodiment has the disadvantage that the throttling valve is not opened, depending on time, after the heating of the coffee maker is switched on, but only, dependent on time, on the pouring-in of the fresh water. Since the fresh water will usually be poured in and the coffee maker switched on simultaneously, this throttling valve can also be sufficient.

There are claimed:

1. Electric coffee maker, having a fresh-water tank from which water is transported through a cold-water line, to a water heater, and from there through a hot water line, to a coffee filter, the combination therewith of a heating device acting on the hot water line, means to activate the heating device, and time delay means disposed in the cold water line to retard flow of said cold water which time delay means is independent of pressure in said cold water line and which sets full water transport into operation with a time delay after the heating device acting on the hot-water line has been activated and preheats said hot-water line during said time delay when the flow of cold water is retarded.

2. Electric coffee maker according to claim 1, wherein the water heater also serves as the heating device.

3. Electric coffee maker, having a fresh-water tank from which water is transported through a cold-water line, to a water heater, and from there through a hot water line, to a coffee filter, the combination therewith of a heating device acting on the hot water line, means to activate the heating device, and time delay means disposed in the cold water line which time delay means is independent of pressure in said cold water line and which sets full water transport into operation with a time delay after the heating device acting on the hot-water line has been activated, a keep-hot heater for a hot plate serving for depositing a coffee pot and a separate water heater, wherein the keep-hot heater serves as the heating device and wherein said time delay means includes a timer which switches on and activates the water heater.

4. Electric coffee maker, having a fresh-water tank from which water is transported through a cold-water line, to a water heater, and from there through a hot water line, to a coffee filter, the combination therewith of a heating device acting on the hot water line, means to activate the heating device, and time delay means disposed in the cold water line which time delay means is independent of pressure in said cold water line and which sets full water transport into operation with a time delay after the heating device acting on the hot-water line has been activated and, wherein the water heater serves as the heating device, and wherein time delay means is a timer and a valve device disposed in the cold-water line for starting the full water transport, actuated by the timer.

5. Coffee maker according to claim 4, wherein the valve device is a throttling valve with a minimum passage opening in normal closed position, which can be opened to full flow for starting the full water transport.

6. Coffee maker according to claim 4, wherein the valve device is a shut-off valve which in normal closed position completely closes any flow.

7. Electric coffee maker, having a fresh-water tank from which water is transported through a cold-water line, to a water heater, and from there through a hot water line, to a coffee filter, the combination therewith of a heating device acting on the hot water line, means to activate the heating device, and time delay means disposed in the cold water line which time delay means is independent of pressure in said cold water line and which sets full water transport into operation with a time delay after the heating device acting on the hot-water line has been activated, wherein the water heater serves as the heating device, and wherein time delay means is a timer and a valve device disposed in the cold-water line for starting the full water transport, wherein both a throttling valve and a shut-off valve are disposed in the cold-water line, and said timer actuates opening the throttling valve with a time delay, after the shut-off valve is opened for full passage.

8. Coffee maker according to claim 7, including another timer to open the shut-off valve with a time delay after the water heater is switched on.

9. Coffee maker according to claims 3 or 4 or 7 or 8, wherein the timer is a temperature control device with a temperature sensor made of bimetal.

10. Coffee maker according to claims 3 or 4 or 7 or 8, wherein the timer is a temperature control device with a temperature sensor made of bimetal, and wherein the temperature sensor is disposed in a housing cavity containing said heating device.

11. Coffee maker according to claim 8, wherein the timer is a temperature control device with a temperature sensor made of bimetal, and wherein the shut-off valve is controlled by the temperature sensor disposed adjacent the water heater.

12. Coffee maker according to claim 5, wherein the timer is a temperature control device with a temperature sensor made of bimetal, and wherein the throttling valve is controlled by said temperature sensor disposed at the hot-water line.

13. Electric coffee maker, having a fresh-water tank from which water is transported through a cold-water line, to a water heater, and from there through a hot water line, to a coffee filter, the combination therewith of a heating device acting on the hot water line, means to activate the heating device, and time delay means disposed in the cold water line which time delay means is independent of pressure in said cold water line and which sets full water transport into operation with a time delay after the heating device acting on the hot-water line has been activated, wherein the water heater serves as the heating device, and wherein time delay means disposed in the cold water line is a throttling valve together with a timer actuated by the temperature of the water in said cold water line with a minimum passage opening of said valve in normal closed position, which can be opened to full flow for starting full water transport, said throttling valve actuated to open after introduction of the fresh water and after the heating device has been actuated.

* * * * *